(12) United States Patent
Cochet

(10) Patent No.: US 12,377,923 B2
(45) Date of Patent: Aug. 5, 2025

(54) TRANSPORT TRAILER COMPRISING A SYSTEM FOR TILTING AND RIGHTING ITS DECK

(71) Applicant: COCHET, Sougé-le-Ganelon (FR)

(72) Inventor: Ludovic Cochet, Sougé-le-Ganelon (FR)

( * ) Notice: Subject to any disclaimer, the term of this patent is extended or adjusted under 35 U.S.C. 154(b) by 550 days.

(21) Appl. No.: 17/791,664

(22) PCT Filed: Jan. 7, 2021

(86) PCT No.: PCT/FR2021/050017
§ 371 (c)(1),
(2) Date: Jul. 8, 2022

(87) PCT Pub. No.: WO2021/140299
PCT Pub. Date: Jul. 15, 2021

(65) Prior Publication Data
US 2023/0123044 A1 Apr. 20, 2023

(30) Foreign Application Priority Data
Jan. 8, 2020 (FR) .................................... 20 00 132

(51) Int. Cl.
*B62D 63/06* (2006.01)
(52) U.S. Cl.
CPC ......... *B62D 63/061* (2013.01); *B62D 63/062* (2013.01)
(58) Field of Classification Search
CPC ............................ B62D 63/061; B62D 63/062
See application file for complete search history.

(56) References Cited

U.S. PATENT DOCUMENTS

| 2,736,568 A | * | 2/1956 | Martin | B60G 17/023 |
| | | | | 74/521 |
| 4,077,643 A | * | 3/1978 | Bates | B60P 1/025 |
| | | | | 280/43.19 |

(Continued)

FOREIGN PATENT DOCUMENTS

EP 1918181 A1 5/2008

OTHER PUBLICATIONS

International Search Report for corresponding application PCT/FR2021/050017 filed Jan. 7, 2021; Mail date May 19, 2021.

*Primary Examiner* — Bryan A Evans
(74) *Attorney, Agent, or Firm* — Sunstein LLP

(57) ABSTRACT

Trailer (1) comprising a frame (111), a deck (11) that is secured to the frame and is intended to support objects that are to be transported, wheels (12) that are secured to the frame and are intended to rest on the ground (S), a draw bar (15) that is pivotally connected to the frame, in a manner substantially parallel to the axes (P3) of the wheels and projecting from the deck in a direction substantially perpendicular to the axes of the wheels, the trailer further comprising a means (19) for immobilizing the pivot connection and a conversion system comprising a flexible elongate element (173) that is secured to the deck and a device (171) for adjusting the length of said element which is attached to the draw bar, the length of said element defining the distance between at least one part of the deck and the ground, the trailer being able to be positioned in a righted position in which the deck is substantially perpendicular to the ground.

9 Claims, 12 Drawing Sheets

(56) References Cited

U.S. PATENT DOCUMENTS

| | | | | |
|---|---|---|---|---|
| 5,474,416 | A * | 12/1995 | Rogge | B62D 63/061 |
| | | | | 414/495 |
| 5,649,802 | A * | 7/1997 | Babcock | B60P 1/025 |
| | | | | 414/483 |
| 5,924,836 | A | 7/1999 | Kelly | |
| 6,863,490 | B2 * | 3/2005 | Godbersen | B62D 63/062 |
| | | | | 414/812 |
| 6,945,744 | B1 * | 9/2005 | Swanson | B60P 1/025 |
| | | | | 414/482 |
| 8,360,462 | B2 * | 1/2013 | Mayfield | B62D 63/061 |
| | | | | 280/491.1 |
| 2007/0018429 | A1 * | 1/2007 | Randall | B60D 1/54 |
| | | | | 280/491.1 |
| 2010/0084839 | A1 | 4/2010 | Mayfield | |
| 2020/0346700 | A1 * | 11/2020 | Nordstrom | B60D 1/06 |

* cited by examiner

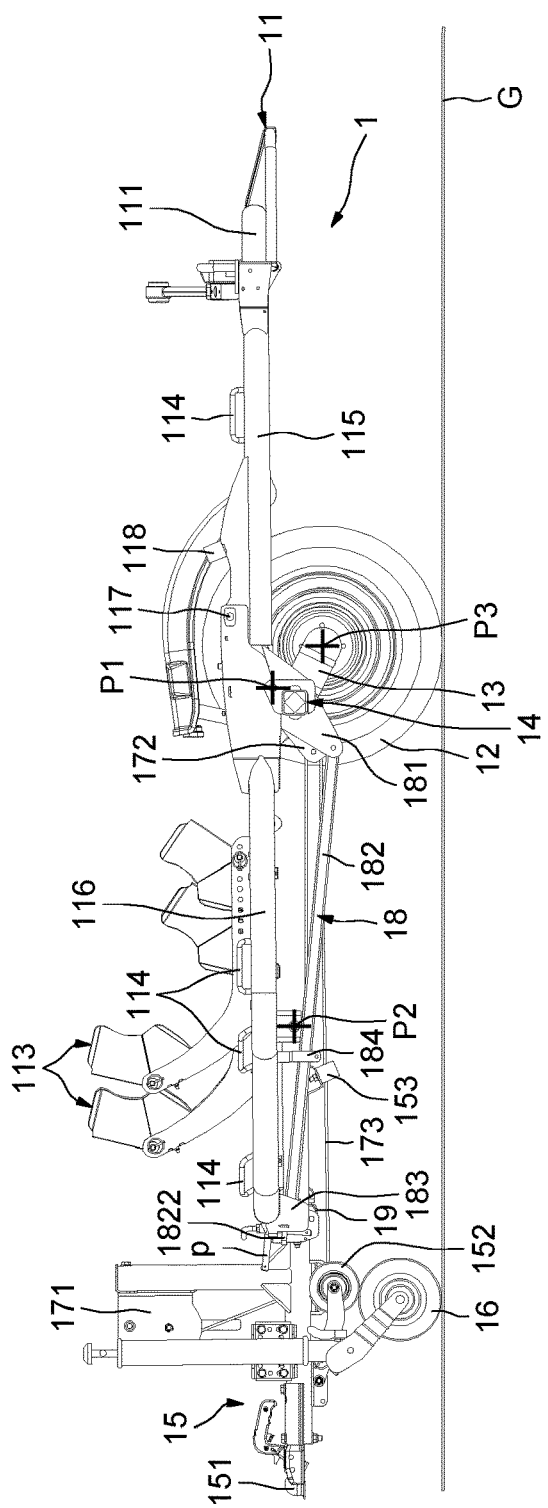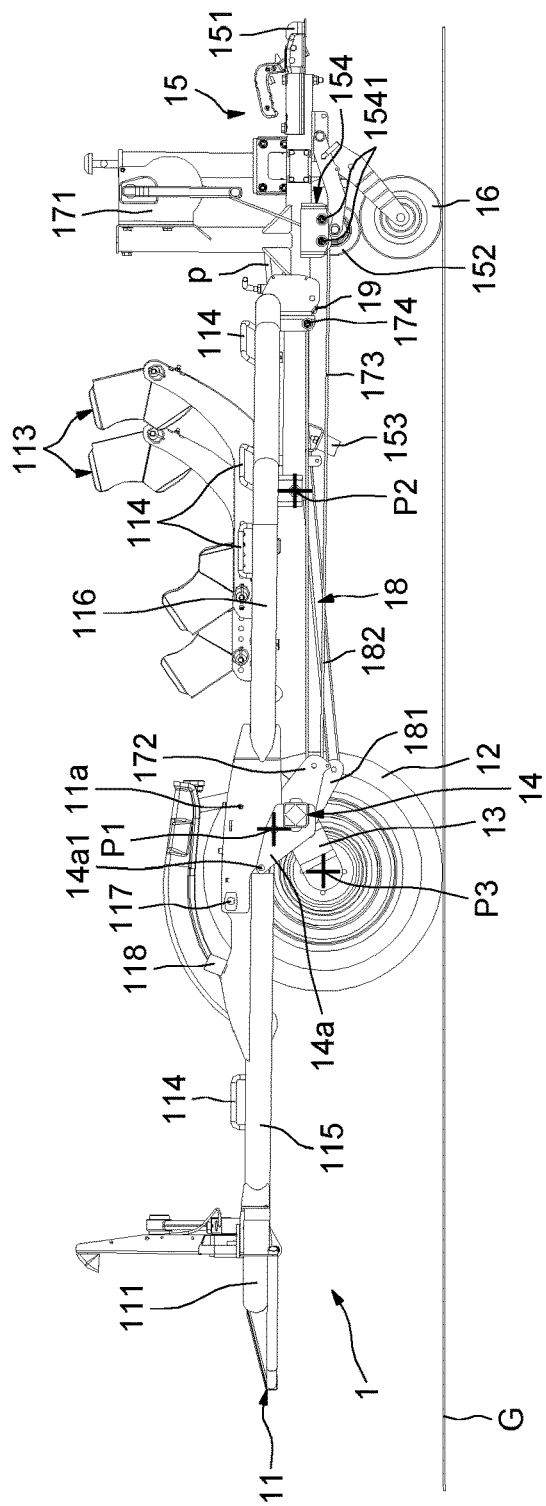
Fig. 4A
Fig. 4B

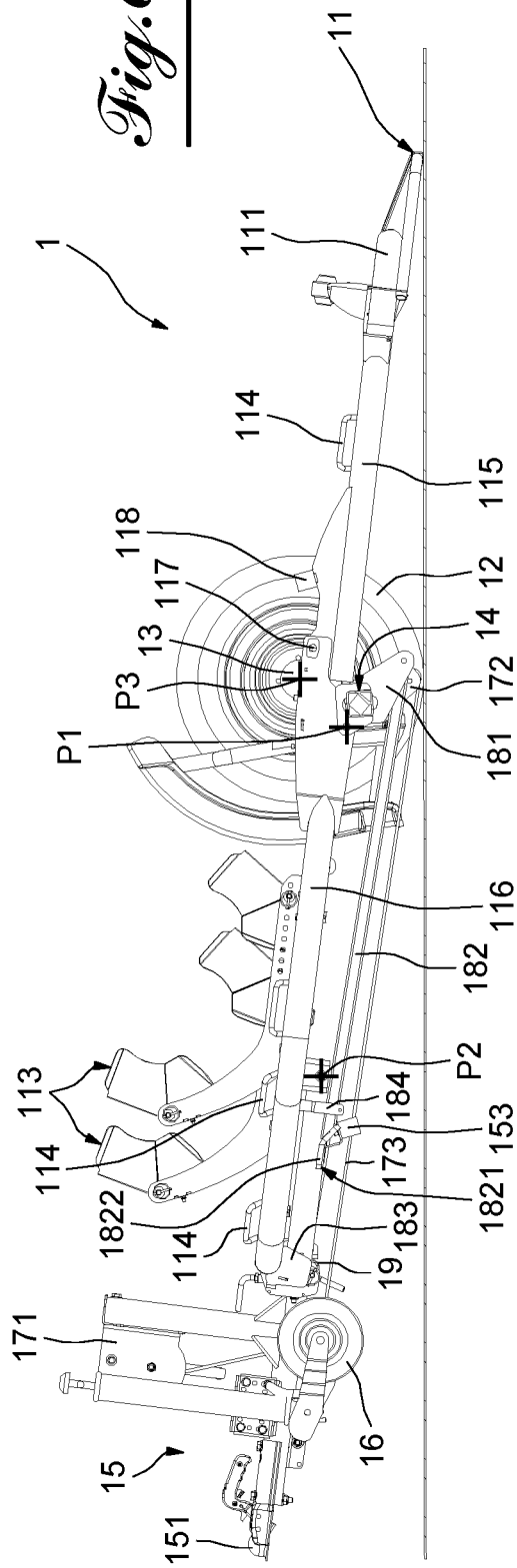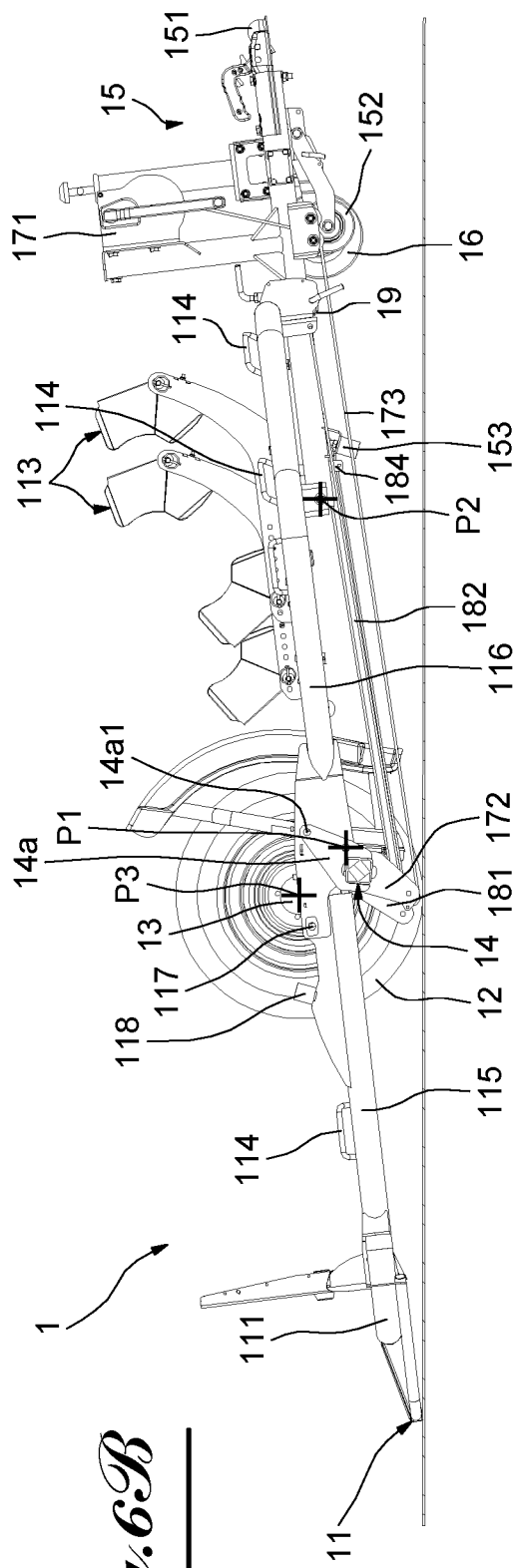

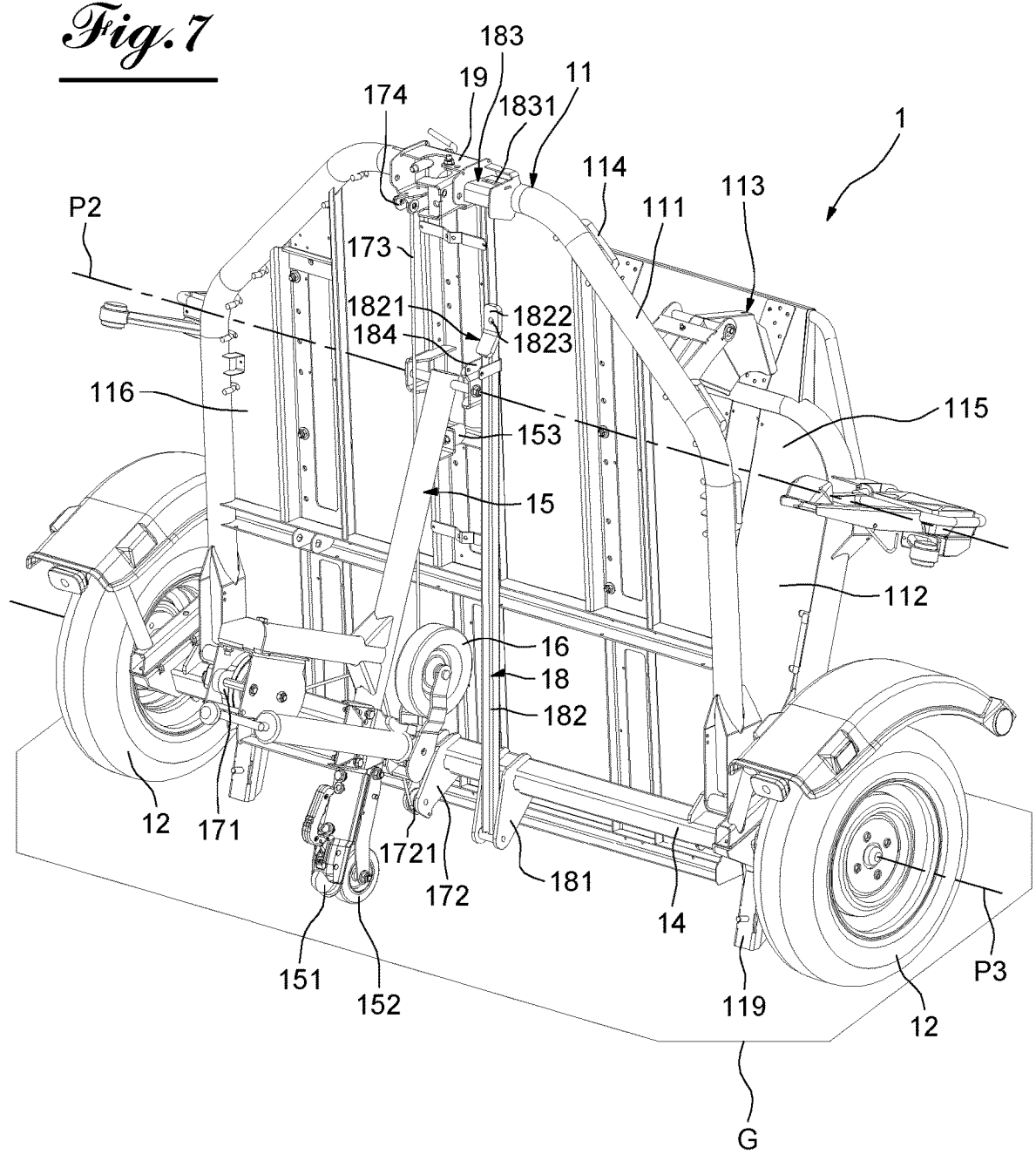

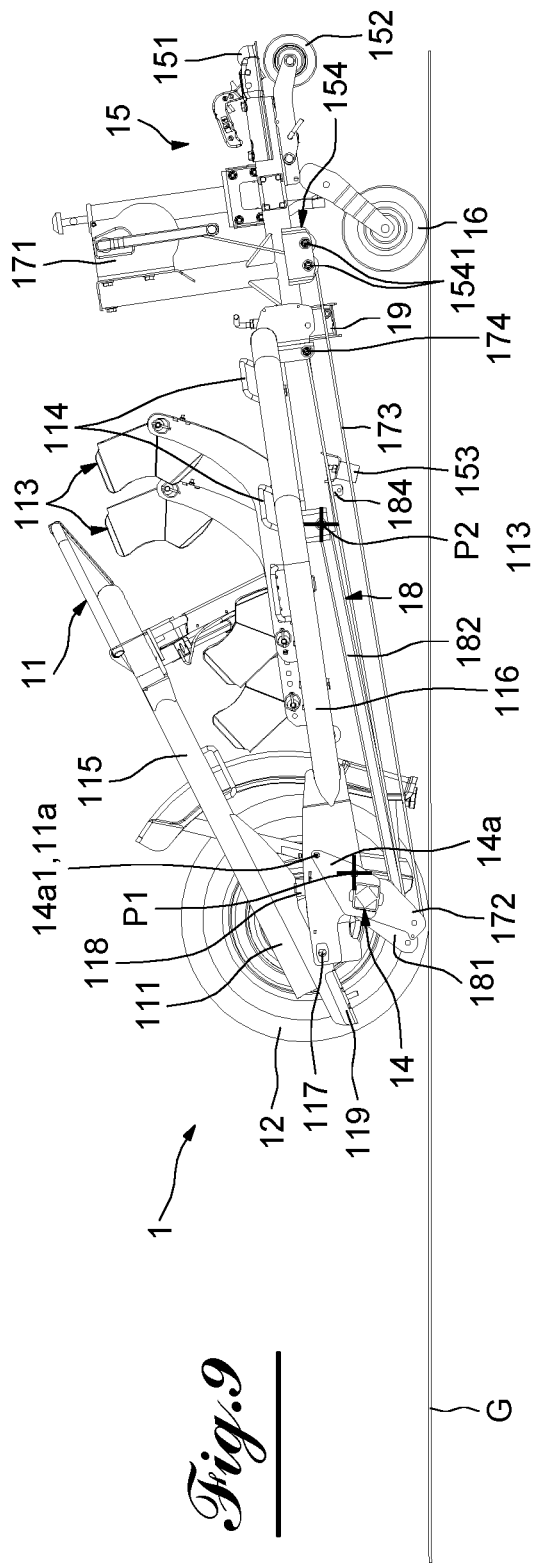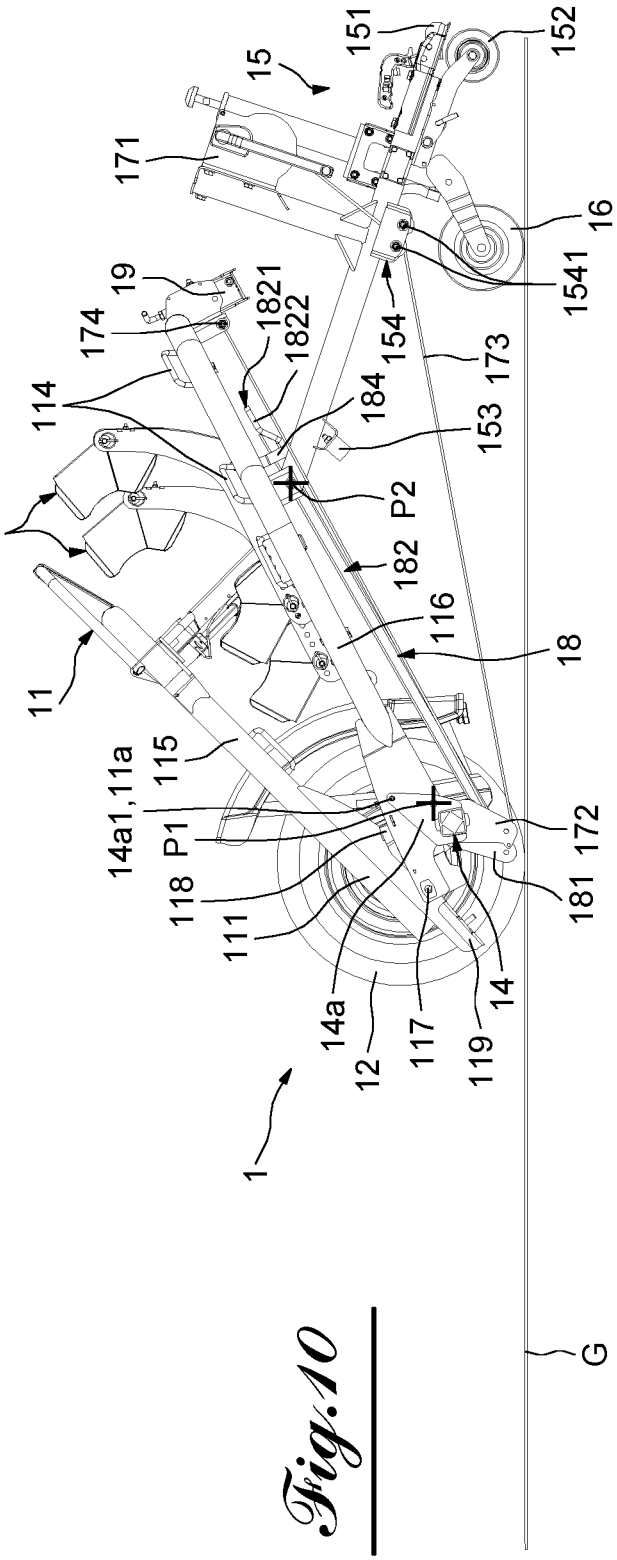

TRANSPORT TRAILER COMPRISING A SYSTEM FOR TILTING AND RIGHTING ITS DECK

The invention relates to a transport trailer which can be tilted and righted, and more particularly to an open deck trailer allowing a user to load and unload heavy and/or bulky objects onto and off a deck of the trailer and otherwise able to be stored in a righted position.

In the automotive field, open trailers are commonly used to transport objects and/or materials which are too large to fit into an enclosed vehicle, which may soil such an enclosed vehicle, or to increase the carrying capacity of a towing vehicle. Such an open trailer may optionally, for a given use, be closed or partially closed using a tarpaulin or other removable structure and then reopened for another use.

The trailers generally comprise a deck arranged for rolling substantially parallel to the ground and on which the objects and/or materials to be transported are placed.

However, the decks of the trailers are arranged at a certain distance from the ground, making it difficult to load and unload heavy and/or bulky objects and/or materials.

It is known, in order to facilitate the loading and unloading of a trailer, to provide a trailer comprising a deck that can be tilted toward the rear of the trailer such that the rear of the deck is, during the loading or unloading phase, in contact with the ground in order to define a slope with respect to the ground. Thus, it is easy for a user to roll the object (the object having at least one wheel or being, for example, placed on a trolley) or the material (the material being, for example, in a wheelbarrow) to be loaded from the ground onto the deck or to be unloaded from the deck to the ground.

WO 2019/162433 A1 describes an example of such a trailer. A trailer described in said document comprises a winch that is attached to a frame and a cable that is connected to an axle of the trailer. As the wheel axle is offset from the axle axis, the winch is able, by unwinding the cable, to rotate the axle relative to the deck, which causes the axle axis to be lowered relative to the wheel axle, making it possible to increase the inclination of the deck relative to the ground until the rear of the deck comes into contact with the ground. The deck thus defines a slope facilitating the loading and unloading of the trailer. Conversely, to arrange the trailer in a rolling position, the winch is able, by winding the cable, to pivot the axle with respect to the deck, which causes the axis of the axle to be raised with respect to the axis of the wheels, making it possible to reduce the inclination of the deck with respect to the ground until the deck is substantially parallel to the ground.

Another problem in relation to trailers is the amount of space they take up when not in use.

An open trailer, which generally has a large floor area compared to its height, occupies a large floor area and an empty space above the trailer which is difficult or impossible to use when it is in the rolling position and not in use but stored in a garage, for example.

It is known, in order to reduce the bulk of a trailer that is not in use, to place the trailer in a so-called righted position in which the deck thereof is arranged substantially perpendicular to the ground. Thus, the ground surface occupied by the trailer in the righted position is less than when the trailer is in the rolling position, which reduces the bulk of the trailer.

The trailer described in WO 2019/162433 A1, cited above, is also able to adopt a righted position. The deck of the trailer described in said document, in addition to the fact that it is tiltable, comprises a front portion and a rear portion that are articulated via a folding axis that is substantially parallel to the axle. The folding axis is arranged such that the rear portion is foldable onto the front portion of the deck and such that wheels of the trailer project rearwardly from said folding axis of the deck. The empty trailer can thus be righted by raising the draw bar thereof so as to pivot the two portions of the deck on the wheels until the folded deck is arranged substantially perpendicular to the ground. The trailer further comprises a folding stand for holding the folded trailer in the righted position.

However, the trailer is righted by the strength of the user. Thus, righting such a trailer can be complicated, or even impossible, depending on the mass of the trailer and the physical strength of the user.

WO 2008/147207 A1 describes a trailer comprising a draw bar that is articulated to the deck via a folding axis. The trailer also comprises a winch mounted on a medial portion of the draw bar and a cable, the ends of which are attached to the winch and to a central portion of the deck. In the rolling position, the draw bar and the trailer deck are arranged substantially parallel to the ground. By winding the cable onto the winch, the distance between the central portion of the deck and the medial portion of the draw bar, to which the cable is attached, is reduced. The trailer is righted by being supported on a rear portion of the deck and on a roller arranged at the coupling head of the trailer, which causes the draw bar to be brought closer to the deck by pivoting about said folding axis.

Such a trailer is thus able to be converted from the rolling position to the righted position, and vice versa, only requiring that the user operates the winch. Thus, a user is able to right a trailer having a large mass. However, said trailer is not easy to use, as the load sill is high and cannot be lowered.

The object of the invention is to provide a trailer that comprises a tiltable deck so as to facilitate loading and unloading of the trailer and that is able to be arranged in a righted position, reducing the bulk of the trailer when not in use, with the least possible strain on the user.

For this purpose, firstly, a trailer is proposed which comprises a frame, a deck that is secured to the frame, the deck being intended to support objects and/or materials to be transported, wheels that are secured to the frame, the wheels being intended to rest on the ground, and a draw bar that is pivotably connected to the frame, the pivot connection being substantially parallel to the axes of the wheels and allowing the draw bar to be folded against the lower surface of the deck.

The draw bar projects from the deck in a direction substantially perpendicular to the axes of the wheels, the trailer further comprising a means for immobilizing the pivot connection and a conversion system comprising a traction means, for example a flexible inelastic elongate element that is secured to the deck and a device for adjusting the length of said element, the length of said element defining the distance between at least one part of the deck and the ground by pivoting the deck about a loading and unloading pivot connection parallel to the wheel axles.

In addition, the trailer is also able to be positioned in a righted position in which the deck is substantially perpendicular to the ground.

Such a trailer thus allows the trailer deck to be lowered in order to facilitate loading and unloading of the trailer. Such a trailer also makes it possible to reduce the bulk thereof when not in use by positioning it in the righted position.

In addition, the device for adjusting the length of the flexible elongated element, or more generally, the device for controlling the traction element is attached to the draw bar or mounted on the draw bar. Thus, it can cause the draw bar to rotate about the pivot thereof, if the pivot is unlocked, and the trailer to right itself on the wheels thereof.

Thus, in addition to converting the trailer between the rolling and lowered positions, the conversion device also allows the trailer to be converted to the righted position. This latter conversion places very little strain on the user and allows for the design of a simple trailer in which a single conversion device allows for switching between three different positions while minimizing efforts.

Various additional features may be provided, alone or in combination:

- the trailer comprises arms, each arm securing one of the wheels to the frame, the arms being pivotally connected to the frame, the pivot connections being different from the axes of the wheels, the trailer further comprising a means of immobilizing the pivot connection;
- the trailer comprises a pulley that is secured to the draw bar, the pulley comprising two rollers that are arranged successively substantially in the direction of projection of the draw bar, the flexible elongate element passing between the two rollers, so as to be coupled to one or other depending on the position of the draw bar with respect to the deck;
- the trailer comprises a roller that is secured to the draw bar, the roller being able to be retracted between the ends of the draw bar or to be unfolded at the end of the draw bar opposite the deck to act as a support;
- the deck comprises a rear portion and a front portion which are movable relative to each other by rotation about a folding axis, the folding axis being arranged between the draw bar and the portion of the wheels furthest from the draw bar.

Secondly, a method of converting a trailer between a rolling position in which wheels of the trailer rest on the ground, a lowered position in which at least one part of a deck of the trailer is closer to the ground than in the rolling position, the deck being intended to support objects and/or materials to be transported, and a righted position in which the deck is substantially perpendicular to the ground, the method comprising, in order to convert the trailer between the rolling and lowered positions, varying a length of a flexible elongate element of the trailer, the method comprising immobilizing a pivot connection of a draw bar of the trailer with a frame of the trailer, the deck being secured to the frame and the draw bar extending in a direction substantially perpendicular to said pivot connection, and comprising, in order to convert the trailer to the righted position, releasing said pivot connection and modifying the length of the flexible elongate element.

Various additional features may be provided, alone or in combination:

- the method further comprises, in order to convert the trailer to the righted position, arranging a roller at the end of the draw bar opposite the deck and reducing the length of the flexible elongate element, and the method comprises, in order to convert the trailer from the righted position, increasing the length of the flexible elongate element, arranging the roller between the ends of the draw bar, and immobilizing the pivot connection;
- the method comprises pre-folding a rear portion and a front portion of the deck against each other, with wheels of the trailer projecting from the deck opposite the draw bar;
- the deck is folded when the trailer is in the rolling position;
- comprises, when the trailer is in the righted position, moving the trailer on the wheels and roller thereof.

The invention will be better understood, and other aims, features, details, and advantages thereof will become clearer in the following explanatory description made with reference to the appended drawings given only as examples illustrating one embodiment of the invention and in which:

FIG. 4A is a schematic cross-sectional view at a plane G-G shown in FIG. 3 of the left-hand side of the trailer in the rolling position;

FIG. 4B is a schematic cross-sectional view at a plane D-D shown in FIG. 3 of the right-hand side of the trailer in the rolling position, as in FIG. 4A;

FIG. 6A is a schematic cross-sectional view at the plane G-G of the left-hand side of the trailer in the lowered position;

FIG. 6B is a schematic cross-sectional view at the plane D-D of the right-hand side of the trailer in the lowered position, as in FIG. 6A;

FIG. 7 is a schematic perspective view of the trailer of FIG. 1 in a righted position, with the deck in a folded position;

FIG. 9 is a schematic cross-sectional view at the plane D-D of the right-hand side of the trailer in the lowered position, with the deck in the folded position, a roller in an extended position, and a jaw in an open position, for the purpose of righting the trailer;

FIG. 10 is a schematic cross-sectional view at the plane D-D of the right-hand side of the trailer in an intermediate position, between the position shown in FIG. 9 and the righted position shown in FIG. 7;

Figure 1:
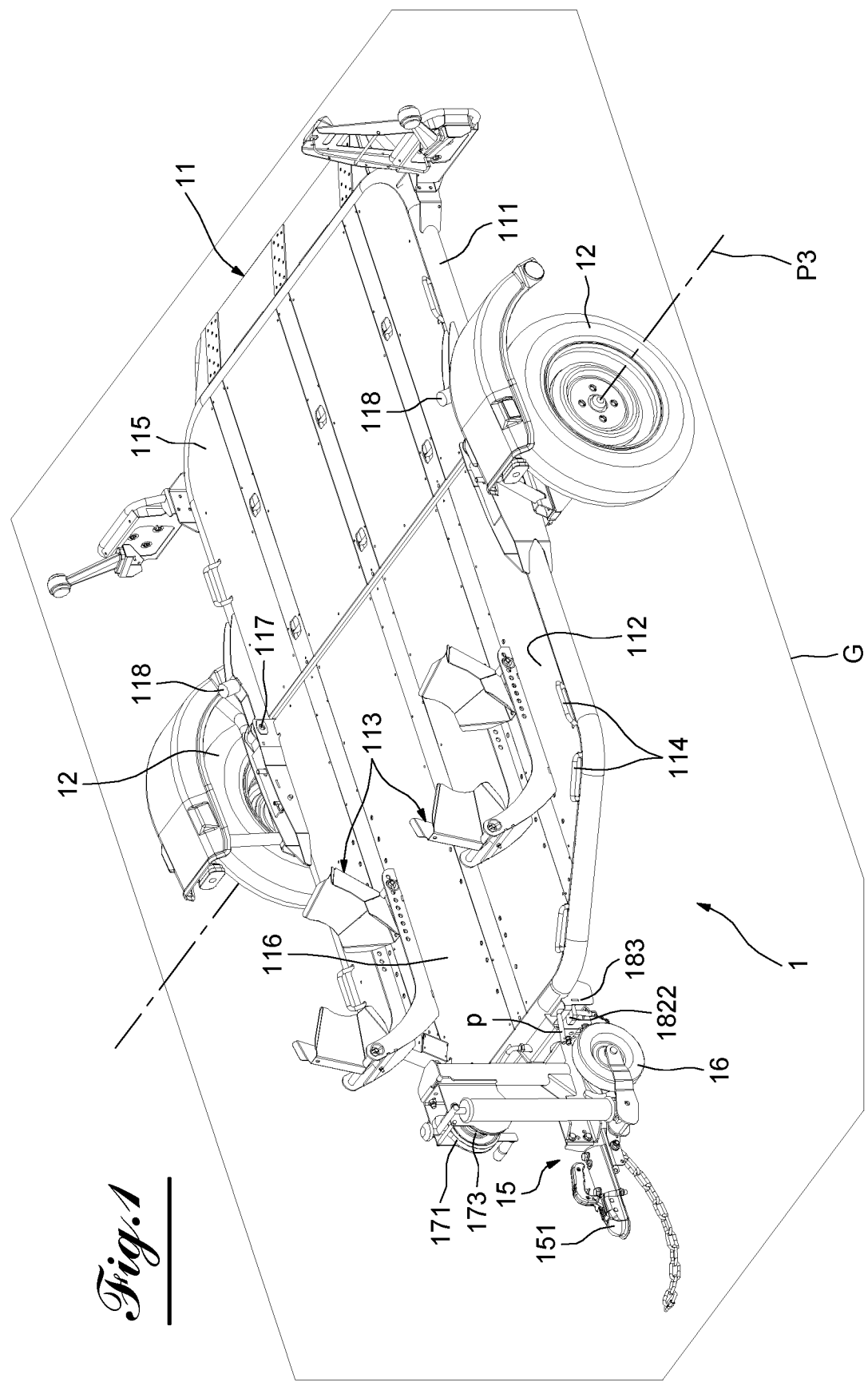
FIG. 1 is a schematic perspective view from above of a trailer in the rolling position.
Figure 2:
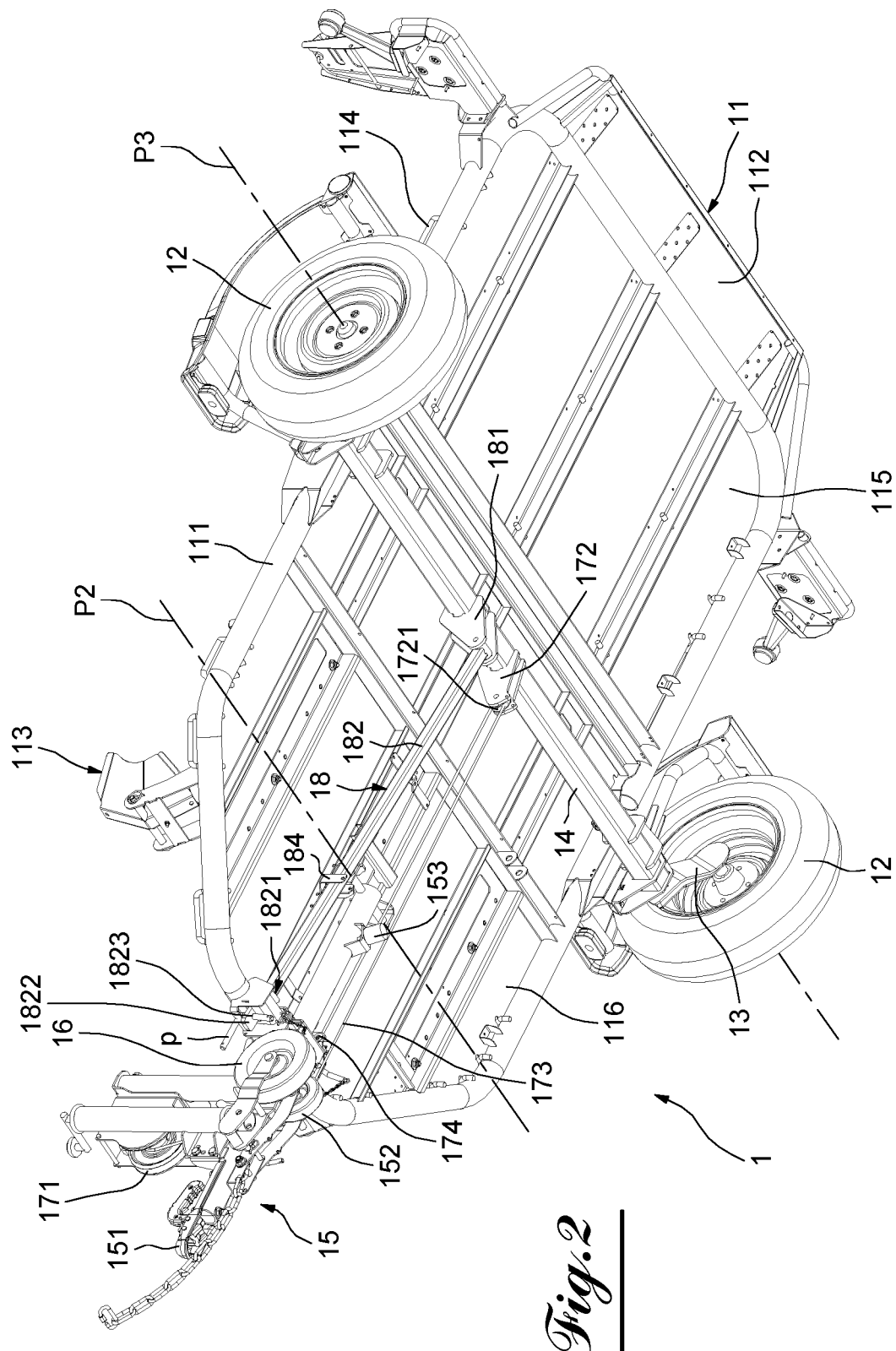
FIG. 2 is a schematic perspective view from below of the trailer of FIG. 1 in the rolling position.

FIGS. 1 to 11 show a trailer 1 comprising a substantially rectangular deck 11, a single wheel set comprising two coaxial wheels 12 that are mounted on either side of the deck 11 along the long sides thereof, and a draw bar 15 projecting from the deck 11 in the middle of a short side of the deck 11 defining the front of the trailer 1. The draw bar 15 comprises a coupling head 151 for moving the trailer 1, for example by attaching said coupling head 151 to a towing vehicle. The wheels 12 are arranged so as to be able to rotate about an axis P3 perpendicular to the horizontal direction defined by the draw bar 15.

The deck 11 is intended to receive objects and/or materials in order to transport same.

According to the embodiment illustrated, the deck 11 comprises a peripheral frame 111 and a floor 112 preferably made of sheet metal.

According to the embodiment illustrated, the trailer 1 is able to transport two motorcycles. For this purpose, the trailer 1 comprises, on the deck 11 thereof, two supports 113 that are each intended to immobilize the front wheel of a motorcycle arranged on the trailer 1. The trailer 1 also comprises attachment means 114 for strapping motorcycles or any other object arranged on the trailer 1.

The trailer 1 comprises a jockey wheel 16 that is secured to the draw bar 15. The jockey wheel 16 can assume two positions: an extended position so as to support the draw bar 15 by resting on the ground G when necessary, in particular when the trailer is not attached to a towing vehicle, and a retracted position so as not to hinder the maneuvering of the trailer when rolling.

Figure 3:
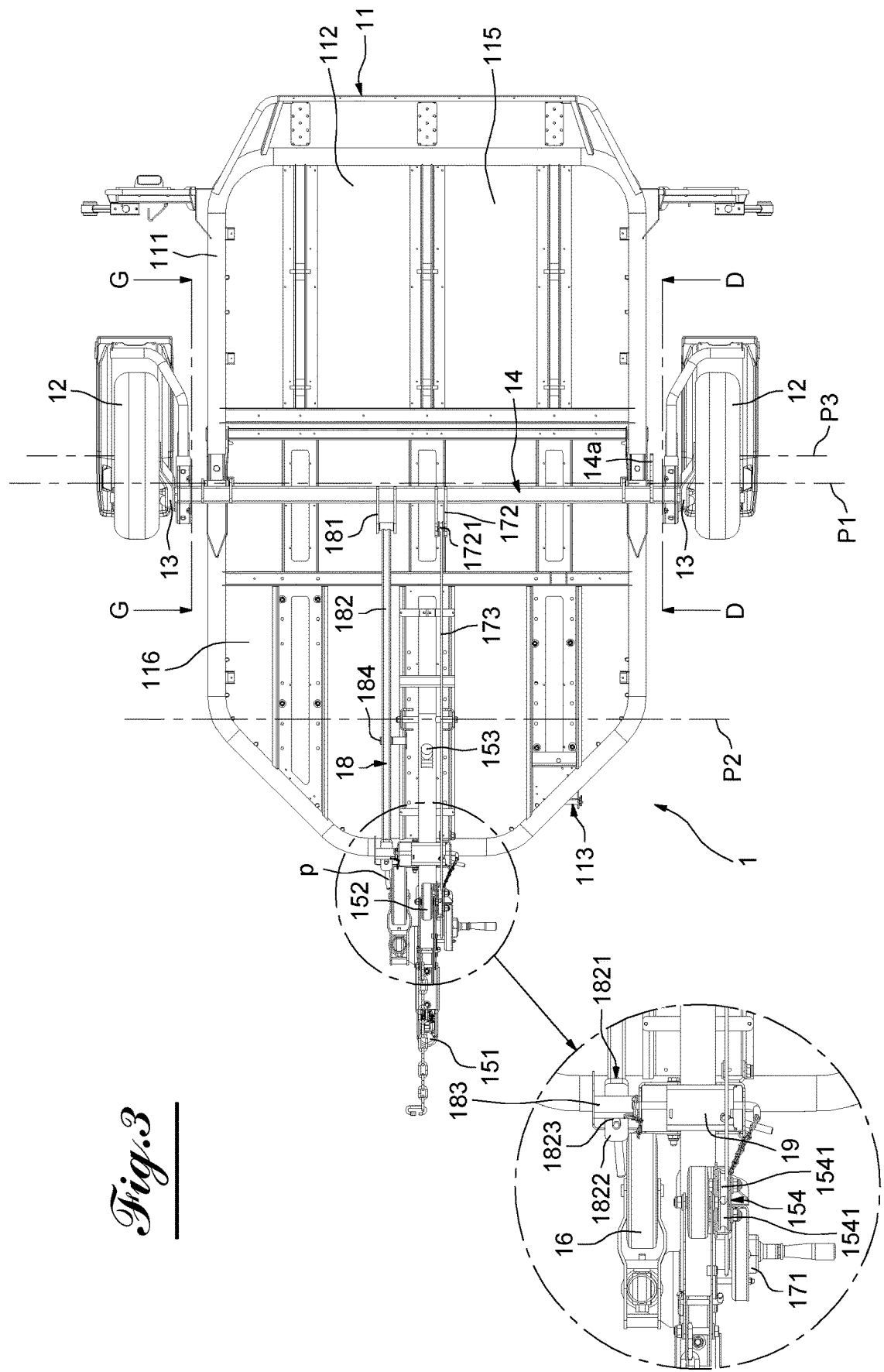
FIG. 3 is a schematic view of the underside of the same trailer in the rolling position.
Figure 5:
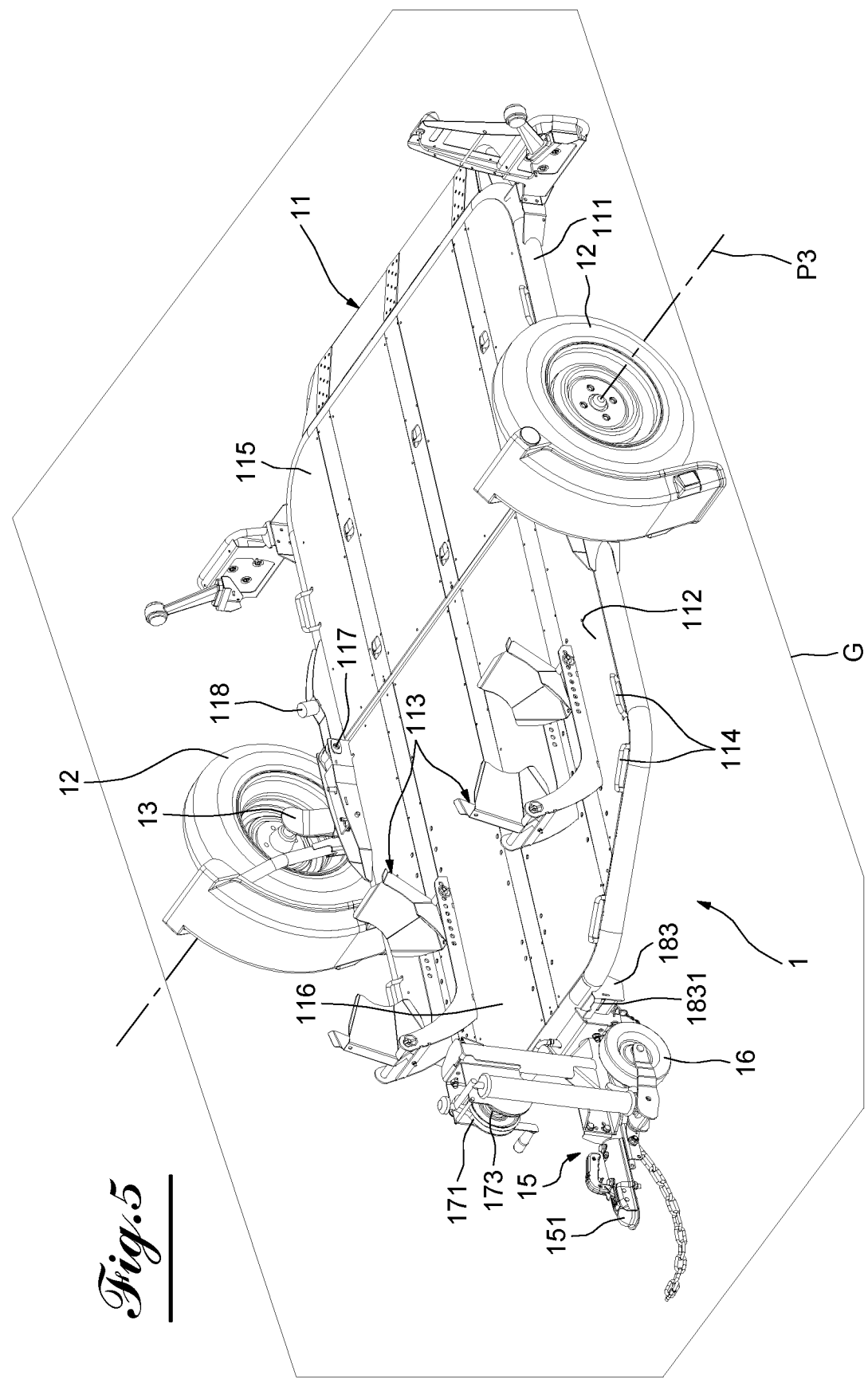
FIG. 5 is a schematic perspective view from above of the trailer of FIG. 1 in the lowered position.

As can be seen in FIG. 3, according to the embodiment shown, the trailer 1 comprises two arms 13 each connecting the hub of one of the wheels 12 to an axle 14 attached under the deck 11. The axle 14 receives, at each end, the arms 13 to which the wheels 12 are attached. The arms 13 are each arranged in a vertical plane parallel to the draw bar 15. The arms 13 offset the axis of rotation P3 of the wheels 12 with respect to an axis defined by the axle 14.

The axle 14 is mounted in a pivot connection P1 with an axis that is horizontal to the deck 11 of the trailer 1.

The trailer 1 also comprises a tilting and righting system. The tilting and righting system comprises a winch 171 that is mounted on the draw bar 15 beyond the boundary of the trailer deck, and a lever 172, a first end of which is flush-mounted on the axle 14 approximately halfway along the axle, under the trailer deck. The tilting and righting system further comprises a metal cable 173 (made of steel, for example) connecting, under the front of the deck, the winch 171, on which it is wound, to the second end of the lever 172. The lever 172 further comprises, at this second end, a roller 1721 on which the cable 173 is slidably mounted so as to keep it away from the axle 14 while allowing an angular return of a traction applied to the cable 173 by the winch. The angular return is made toward the front of the trailer, under the deck, and up to a fixed point of attachment of the end of the cable, at the front portion of the deck.

This tilting and righting system allows the trailer 1 to be converted from a rolling position, in which the deck 11 thereof is substantially parallel to the ground G, to a lowered position, in which the deck 11 is tilted relative to the ground G. The rolling position is illustrated in FIGS. 1 to 3, 4A, and 4B. The lowered position is shown in FIGS. 5, 6A, 6B, 8A, and 8B.

Figure 12:
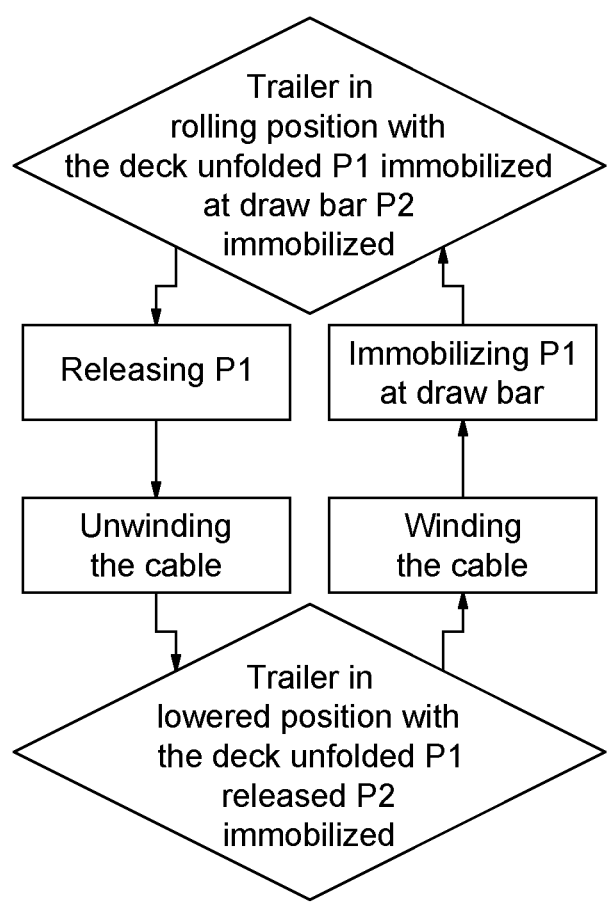
FIG. 12 is a flow chart showing the steps for converting the trailer from the rolling position to the lowered position, and vice versa.

In the rolling position, the axis of rotation P3 of the two wheels 12 is not arranged vertically to the axle 14. Thus, as illustrated in FIG. 12, when the length of the cable 173 is increased, by unwinding the cable 173 from the winch 171, the axle 14 pivots due to gravity about the pivot connection P1 thereof to the deck 11, under the action of the weight of the deck 11 combined with the offset of the axis P3 of the wheels 12 by the arms 13. This pivoting brings the axle 14 closer to the ground G, in a movement that can be seen by comparing FIG. 1 to FIG. 5 or FIGS. 4A, 4B to FIGS. 6A, 6B. The coupling head 151 of the draw bar 15 remains at a substantially fixed distance from the ground G, by resting the jockey wheel 16 on the ground G or by attaching the coupling head 151 to the towing vehicle, and the rear portion 115 of the deck 11, on the other hand, moves closer to the ground G. The trailer 1 is thus converted from the rolling position to the lowered position.

According to the embodiment illustrated, the lowered position is reached when the rear portion 115 of the deck 11 is in contact with the ground G.

Conversely, as illustrated in FIG. 12, when the length of the cable 173 is reduced, by winding the cable onto the winch 171, the lever 172 causes the axle 14 to pivot about the pivot connection P1 thereof to the deck 11. This pivoting causes the arms 13 to pivot, moving the axle 14 away from the ground G, in a movement that can be seen by comparing FIG. 5 with FIG. 1 or FIGS. 6A, 6B with FIGS. 4A, 4B. The coupling head 151 of the draw bar 15 remaining at a substantially fixed distance from the ground G, still by resting the jockey wheel 16 on the ground G or by attaching the coupling head 151 to the towing vehicle, the rear portion 115 of the deck 11 moves away from the ground G until the trailer is in the rolling position.

According to the embodiment shown, in the rolling position, the arms 13 are oriented such that the axis P3 of the wheels 12 is arranged toward the rear of the trailer 1 and lower than the axle 14.

In addition, according to one embodiment, the axle 14 comprises an outer part that is attached to the frame 111 and an inner part that is secured to the outer part by dampers. The arms 13 are attached to the inner part. Thus, during the rolling phase, the arms 13 stress the dampers via the inner part, which dampens the vibrations due to rolling.

According to the embodiment illustrated, and as can be seen in FIGS. 2, 3, 4A, and 4B, in the rolling position, the lever 172 is oriented such that the roller 1721 of the lever 172 is arranged toward the front of the trailer 1 with respect to the axle 14 and lower than the axle 14.

Thus, due to the orientation of the arms 13, the roller 1721 of the lever 172 moves away from the winch 171 and lowers as the trailer is converted from the rolling position thereof to the lowered position thereof. This can be seen by comparing FIGS. 4A, 4B and 6A, 6B.

The advantage of the position of the lever 172 in the rolling position and the movement thereof to the lowered position is that the lever 172 cannot come into contact with the deck 11, which allows the axle 14 to be moved closer to the deck 11 so as to reduce the inclination of the deck 11 in the lowered position and to lower the centre of gravity of the trailer 1.

Figure 8A:
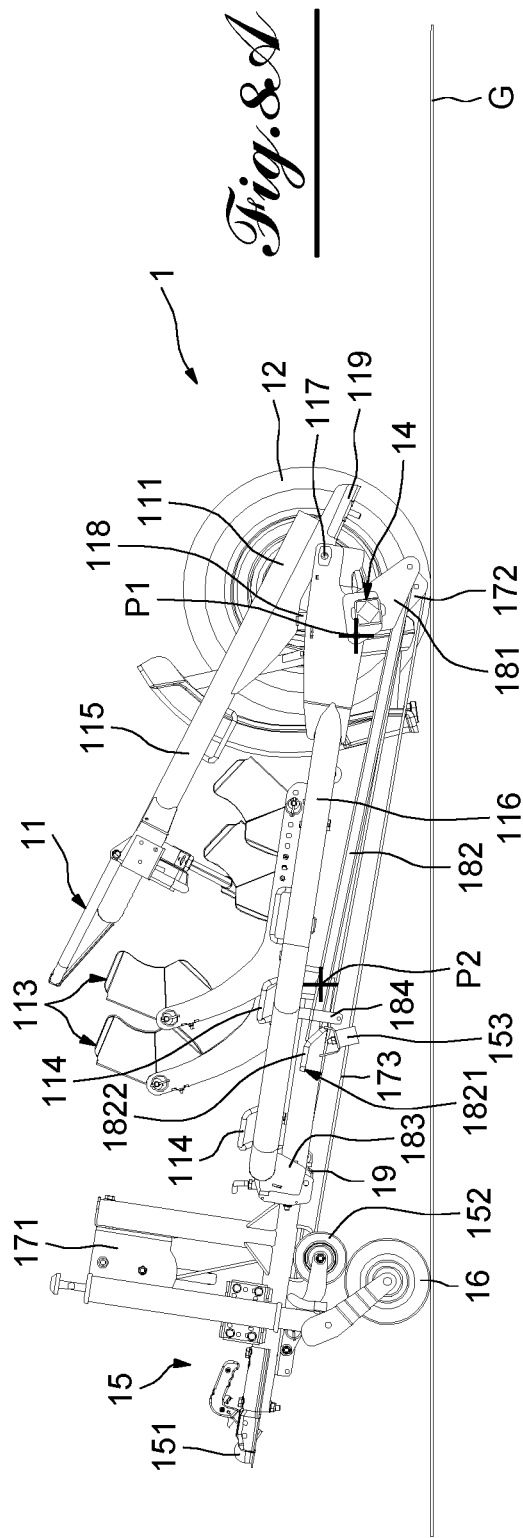
FIG. 8A is a schematic cross-sectional view at the plane G-G of the left-hand side of the trailer in a lowered but not yet righted position, with the deck in a folded position.

According to the embodiment shown, in particular in FIGS. 4A, 7A, and 8A, the trailer comprises a locking system 18. This locking system 18 comprises an offset bar 181 that is secured to the axle 14 and an immobilizing bar 182 that is secured, at one end, to the offset bar 181. The offset bar 181 moves said end of the immobilizing bar 182 away from the axle 14. Another end of the immobilizing bar 182 comprises an immobilizing means 1821 intended to cooperate with an immobilizing means 183 that is secured to the deck 11 of the trailer 1 when the trailer 1 is in the rolling position.

Thus, the pivot connection P1 between the axle 14 and the deck 11 can be immobilized at the draw bar 15, which causes the trailer 1 to be locked in the rolling position by the locking system 18, thus reducing the tension of the cable 173 in the rolling position.

According to the embodiment illustrated, the immobilizing means 1821 for the immobilizing bar 182 comprises a flat piece 1822 comprising a hole 1823. The immobilizing means 183, which is secured to the deck 11, comprises a slot 1831 intended to let the flat part 1822 enter when the trailer 1 is in the rolling position. A pin p is intended to be received in the hole 1823 of the flat part 1822 when it is in the slot 1831, preventing the flat part 1822 from coming out of the slot 1831.

According to the embodiment illustrated, the locking system 18 comprises a slide 184 through which the immobilizing bar 182 passes. The slide 184 holds the immobilizing bar 182 on the side of the locking means 1821 thereof such that, when the trailer 1 is converted to the rolling position, the flat element 1822 automatically enters the slot 1831.

Figure 11:
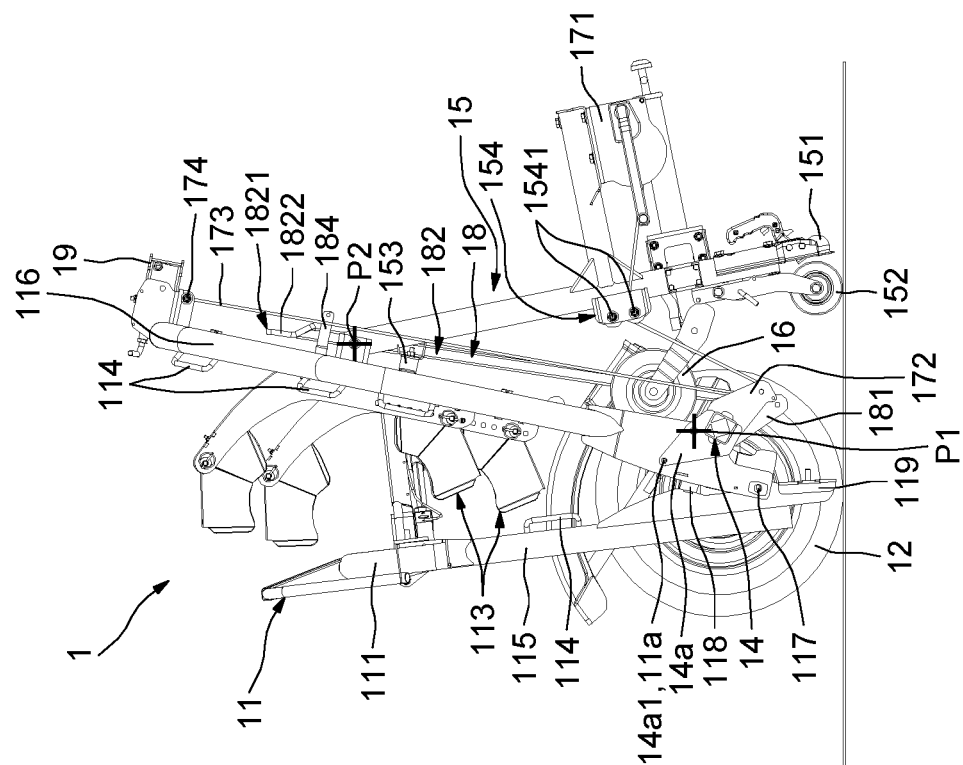
FIG. 11 is a schematic cross-sectional view in plane D-D of the right-hand side of the trailer in the righted position, as shown in FIG. 7.

The tilting and righting system also allows the trailer 1 to move from the lowered position to a so-called righted position, in which the deck 11 is substantially perpendicular to the ground G. The righted position is illustrated in FIGS. 7 and 11.

Figure 8B:
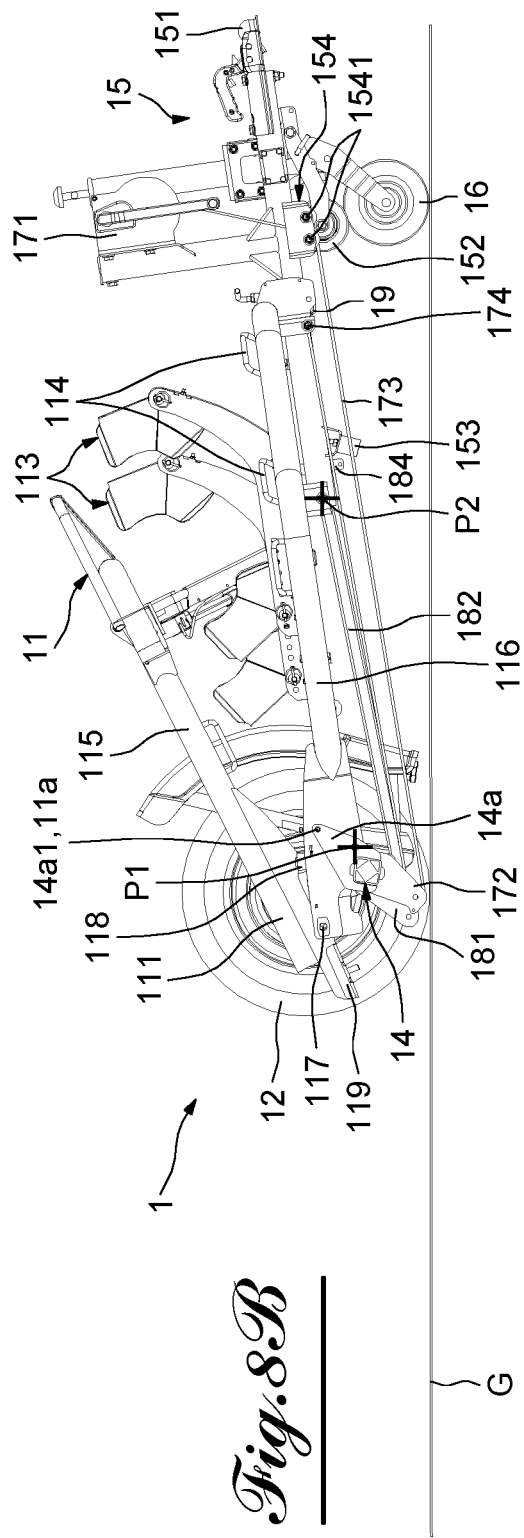
FIG. 8B is a schematic cross-sectional view at the plane D-D of the right-hand side of the trailer in the lowered but not yet righted position, with the deck in the folded position, as in FIG. 8A.
Figure 13:
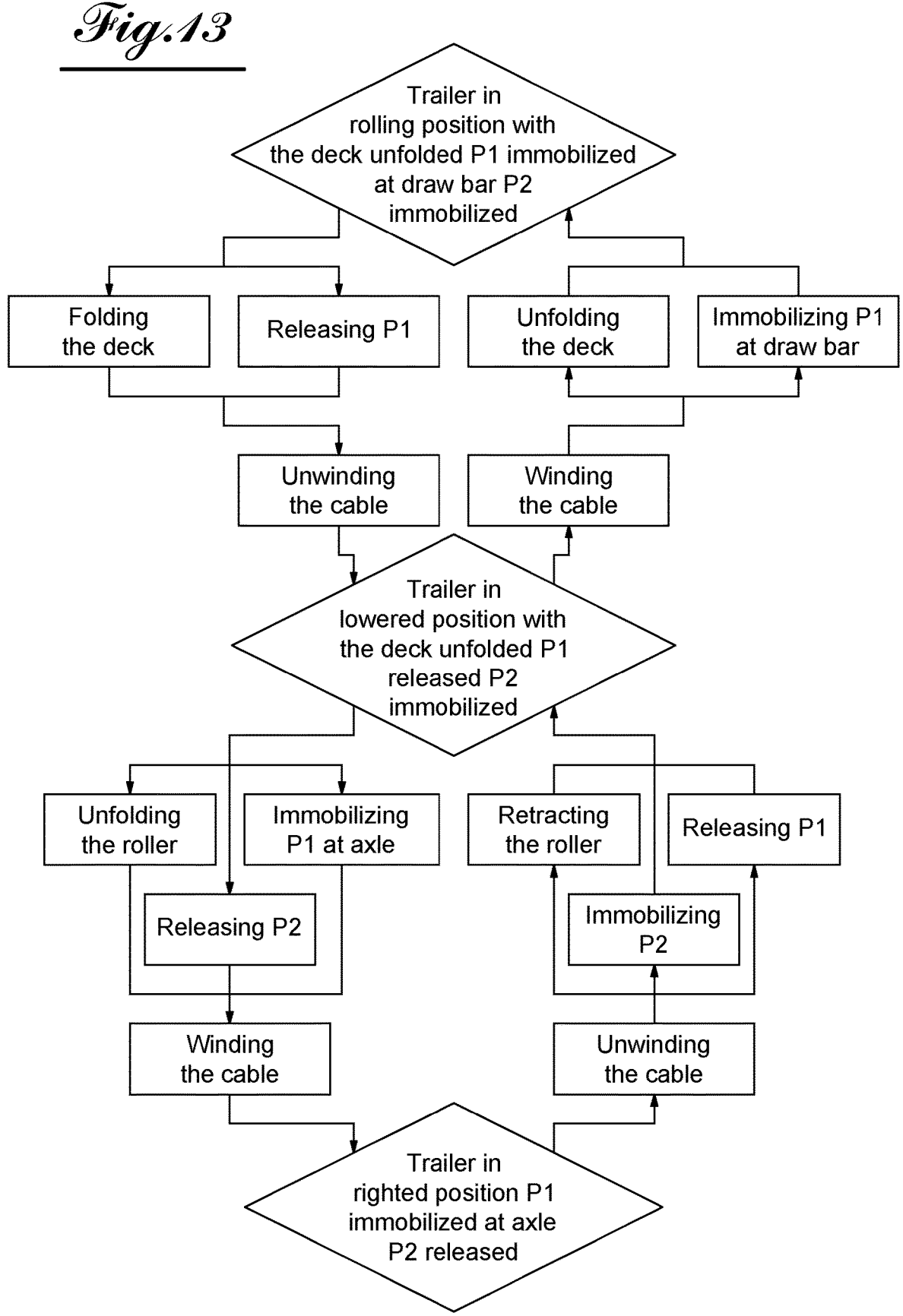
FIG. 13 is a flow chart showing the steps for converting the trailer from the rolling position to the righted position, and vice versa.

According to the embodiment shown, in order to convert the trailer 1 to the righted position, the deck 11 comprising a front portion 116 and a rear portion 115 that are movable relative to each other by rotation about an axis 117, the rear portion 115 of the deck 11 is folded toward the front portion 116 of the deck 11, as shown in FIGS. 8A, 8B, and 13. When the deck 11 is in the folded position, the deck 11 does not project beyond the wheels 12 toward the rear of the trailer 1.

At least one of the portions 115, 116 of the deck 11 comprises at least one buffer 118 defining, by abutment against the other of the portions 115, 116, the folded position of the deck 11. The buffer 118 allows the two portions 115, 116 of the deck 11 not to be in direct contact so as not to damage the deck 11. The deck 11 is preferably held in the folded position by means of a strap (not shown).

According to the embodiment illustrated, the rear portion 115 of the deck 11 comprises at least one lug 119 projecting toward the front of the trailer 1 from the axis of rotation 117 of the deck 11. This lug 119 is intended to define, by a stop effect, the unfolded position of the deck 11 by contact between the lug 119 and the front portion 116 of the deck 11. This lug 119 is able to be secured to the front portion 116 of the deck 11 in order to keep the deck 11 in the unfolded position.

According to the embodiment illustrated, the deck 11 can only be converted to the folded form thereof when the trailer 1 is in the rolling position, otherwise the lug 119 comes into contact with the axle 14, which prevents the rear portion 115 of the deck 11 from rotating and thus prevents the deck 11 from folding. In order to fold the deck 11 and tilt the trailer, it is therefore necessary, according to the embodiment shown, in particular in FIG. 13, to first fold the deck 11, and only then lower the trailer 1.

The lowered position of the trailer 1 is reached by following the same steps as when the trailer deck 11 is unfolded.

Once the deck 11 is in the folded position and the trailer 1 is in the lowered position, as shown in FIGS. 8A and 8B, in order to right the trailer 1, a wheel 152 which is mounted under the draw bar 15 and which was previously retracted is unfolded and arranged in front of the coupling head 151, as shown in FIG. 9. Furthermore, a jaw 19 immobilizing the draw bar 15 against the deck 11 is opened, as shown in FIG. 9.

More specifically, according to the embodiment shown, the roller 152 is able to move from a retracted position behind the coupling head 151 to a position in front of the coupling head 151 by rotation under the draw bar 15.

The draw bar 15 is also articulated to the deck 11 by a rotation axis P2 defining a pivot connection parallel to the axle 14. This axis P2 is arranged at an end of the draw bar 15 opposite the coupling head 151 and under the deck 11. This axis P2 is preferably arranged at approximately two-thirds of the distance between the axle 14 and the front of the deck 11, closer to the front of the deck 11 than to the axle 14. The jaw 19, which is secured to the deck 11 and placed in front of the latter, keeps the draw bar 15 substantially parallel to the deck 11 and thereagainst in the rolling and lowered positions of the trailer 1, preferably clasping the draw bar 15 at approximately one third of the length thereof, starting from the axis of rotation P2 thereof.

Furthermore, to right the trailer according to the embodiment illustrated, the axle 14 is prevented from pivoting relative to the deck 11 about the pivot connection P1 at the axle 14. To this end, according to the embodiment illustrated, the axle 14 comprises an immobilizing plate 14a, as can be seen in FIGS. 3, 4B, 6B, 8B, and 9 to 11, comprising a hole 14a1. A pin (not shown) is intended to be inserted into said hole 14a1 and into a hole 11a in the deck 11, said holes 11a, 14a1 being aligned when the trailer 1 is in the lowered position.

Once the deck 11 is in the folded position, the trailer 1 in the lowered position, the roller 152 arranged in front of the coupling head 151, the jaw 19 open, and the axle 14 prevented from pivoting with respect to the deck 11 immobilized, the trailer 1 is righted by winding the cable 173 onto the winch 171.

FIG. 10 shows the trailer 1 at the beginning of the righting process and FIG. 11 shows the trailer in the righted position.

As can be seen in FIG. 10, during the righting process, as the length of the cable 173 between the winch 171 and the roller 1721 of the lever 172 decreases, the draw bar 15 pivots about the pivot connection P2 thereof to the deck 11. As the deck 11 does not project beyond the wheels 12 toward the rear of the trailer 1, the deck 11 pivots on the wheels 12, about the axis of rotation P3 thereof, and the draw bar 15 rests, firstly, on the jockey wheel 16.

Secondly, the draw bar 15, continuing to pivot, rests on the roller 152, the jockey wheel 16 no longer touching the ground G, as shown in FIG. 11.

In the righted position, the trailer 1 rests on the wheels 12 thereof and on the roller 152, allowing it to be moved easily.

To convert the trailer 1 from the righted position to the rolling position, the same steps are performed in reverse, as shown in FIG. 13.

According to the embodiment illustrated, the draw bar 15 comprises a buffer 153 defining, by abutment against the deck 11, the righted position of the trailer 1. This buffer 153 allows the draw bar 15 and the deck 11 not to be in direct contact so as not to damage them.

According to the embodiment illustrated, the winch 171 is arranged above the draw bar 15 when the trailer is in the rolling or lowered position. The trailer 1 comprises a pulley 154 having two rollers 1541 aligned substantially along a direction defined by the draw bar 15 and between which the cable 173 passes.

Thus, the winch 171 is more easily accessible and the underside of the trailer 1 is less bulky.

The pulley roller 1541 arranged toward the rear of the trailer 1 allows the cable 173 to be guided between the winch 171 and the lever 172 when the trailer 1 is in the rolling position, in the lowered position, and at the beginning of the process of righting the trailer 1, as shown in FIGS. 3, 4B, 6B, 8B, 9, and 10.

The roller 1541 of the pulley arranged toward the front of the trailer 1 allows the cable 173 to be guided between the winch 171 and the lever 172 when the trailer 1 is at the end of the righting process and in the righted position, as shown in FIG. 11. This front roller 1541 is necessary, in the embodiment illustrated, because, in the righted position, the winch 171 is further from the ground G than the lever 172.

According to the embodiment shown, in particular in FIGS. 4B, 6B, 8B, and 9 to 11, the tilting and righting system also comprises an anchor 174 of the end of the cable 173 that is secured to the front of the deck 11. Thus, the cable 173 is attached at both ends to the winch 171 and to the anchor 174, and the cable 173 passes through the roller 1721 of the lever 172.

This anchor 174 allows the force required at the winch 171 for compensating the force required at the lever 172 to pivot the axle 14 to be divided by two.

According to different embodiments, the trailer 1 comprises walls laterally delimiting the deck 11 and/or other attachment means and/or supports.

According to different embodiments, the lowered position is reached when the axis P3 of the wheels 12 is substantially vertical to the axle 14.

According to different embodiments, the trailer 1 does not comprise an axle 14 and the arms 13 are mounted directly under the trailer deck 11 of the trailer 1.

According to different embodiments, the trailer 1 is converted from the rolling position to the righted position without passing through the lowered position.

Instead of the steel cable 173, a cable of another material, a chain, a rope, or a strap can be used.

This trailer 1 thus makes it easier to load and unload while reducing the space required for storage and requiring very little of the user.

| FIG. | French | English |
|---|---|---|
| 1, 2, 3, 4A, 4B | g | p |
| 4A, 4B, 5, 8A, 8B, 9, 10, 11 | S | G |
| 12, 13 | Remorque en position de roulage avec le plateau déplié P1 bloquée niveau timon P2 bloquée | Trailer in rolling position with the deck unfolded P1 immobilized at draw bar P2 immobilized |
| 12, 13 | Déblocage de P1 | Releasing P1 |
| 12, 13 | Blocage de P1 niveau timon | Immobilizing P1 at draw bar |
| 12, 13 | Déroulement du câble | Unwinding the cable |
| 12, 13 | Enroulement du câble | Winding the cable |
| 12, 13 | Remorque en position abaissée avec le plateau déplié P1 débloquée P2 bloquée | Trailer in lowered position with the deck unfolded P1 released P2 immobilized |
| 13 | Pliage du plateau | Folding the deck |
| 13 | Dépliage du plateau | Unfolding the deck |
| 13 | Dépliage de la roulette | Unfolding the roller |
| 13 | Blocage de P1 niveau essieu | Immobilizing P1 at axle |
| 13 | Escamotage de la roulette | Retracting the roller |
| 13 | Déblocage de P2 | Releasing P2 |
| 13 | Blocage de P2 | Immobilizing P2 |
| 13 | Remorque en position redressée P1 bloquée niveau essieu P2 débloquée | Trailer in righted position P1 immobilized at axle P2 released |

The invention claimed is:

1. A trailer (1) comprising a transport deck (11), wheels (12), a draw bar (15) that is in a draw bar pivot connection (P2) with the deck (11), the draw bar pivot connection (P2) being parallel to the axes (P3) of the wheels (12) and allowing the draw bar to be folded back against the lower surface of the deck, the trailer (1) further comprising a means (19) for immobilizing and releasing the draw bar pivot connection (P2) and a converting system comprising a traction means (171, 173) for the deck (11), defining a distance between the deck (11) and the ground (G) by pivoting the deck (11) about a loading and unloading pivot connection (P1) parallel to the axes (P3) of the wheels, the trailer (1) further being able to be arranged in a righted position, the trailer (1) being characterized in that a device (171) for controlling the traction means is mounted on the draw bar (15),
wherein the trailer comprises a pulley (154) that is secured to the draw bar (15), the pulley (154) comprising two rollers (1541) arranged successively in the direction of projection of the draw bar (15), the traction means (173) passing between the two rollers (1541) so as to be coupled to one or the other.

2. The trailer (1) according to the preceding claim, characterized in that said trailer comprises arms (13), each arm (13) securing one of the wheels (12) to the deck (11), the arms (13) being connected to the deck (11) by the loading and unloading pivot connection (P1), the loading and unloading pivot connection (P1) being different from the axes (P3) of the wheels (12), the trailer (1) further comprising a means (11a, 14a) for immobilizing the loading and unloading pivot connection (P1).

3. The trailer (1) of claim 1, characterized in that said trailer comprises a wheel (152) that is secured to the draw bar (15), the wheel (152) being able to be retracted between the ends of the draw bar (15) or of being unfolded at the end of the draw bar (15) opposite the deck (11) in order to act as a support.

4. The trailer (1) of claim 1, characterized in that the deck (11) comprises a rear portion (115) and a front portion (116) which are movable relative to each other by rotation about a folding axis (117), the folding axis (117) being arranged between the draw bar (15) and the portion of the wheels (12) furthest from the draw bar (15).

5. The trailer (1) of claim 1, characterized in that the traction means (171, 173) for the deck (11) comprises a metal cable and the device (171) for controlling said traction means (171, 173) is a winch (171).

6. The trailer (1) of claim 1, characterized in that the means for immobilizing and releasing the draw bar is a jaw placed in front of the deck.

7. A method of converting the trailer (1) of claim 1 between a rolling position in which wheels (12) of the trailer (1) rest on the ground (G), a lowered position in which at least one part of a deck (11) of the trailer (1) is closer to the ground (G) than in the rolling position, the deck (11) being intended to support objects and/or materials to be transported, and a righted position, the method comprising, in order to convert the trailer (1) between the rolling position and the lowered position, varying a length of a traction means (173) of the trailer (1), the method being characterized in that it comprises, in order to convert the trailer (1) from the rolling position to the lowered position, immobilizing a draw bar pivot connection (P2) of a draw bar (15) of the trailer (1) to a deck (11) of the trailer (1), the draw bar (15) extending in a direction perpendicular to said draw bar pivot connection (P2), and in that said method comprises, in order to convert the trailer (1) to the righted position, releasing said draw bar pivot connection (P2) and modifying the length of the traction means (173).

8. The method of claim 7, characterized in that said method further comprises, in order to convert the trailer to the righted position, arranging a roller (152) at the end of the draw bar (15) opposite the deck (11) and reducing the length of the traction means (173), and in that said method comprises, in order to convert the trailer from the righted position, increasing the length of the traction means (173), arranging the roller (152) between the ends of the draw bar (15), and immobilizing the draw bar pivot connection (P2).

9. The method of claim 7, characterized in that said method comprises, in order to convert the trailer to the righted position, prefolding a rear portion (115) and a front portion (116) of the trailer deck (11) against each other, wheels (12) of the trailer (1) projecting from the deck (11) opposite the draw bar (15), a rear portion (115) and a front portion (116) of the deck (11) being folded against each other when the trailer (1) is in a rolling position.

\* \* \* \* \*